United States Patent [19]
McCann et al.

[11] Patent Number: 5,740,037
[45] Date of Patent: Apr. 14, 1998

[54] GRAPHICAL USER INTERFACE SYSTEM FOR MANPORTABLE APPLICATIONS

[75] Inventors: Thomas E. McCann, Huntington Beach; Andrew Ausman, Garden Grove; Douglas M. Kavner, Orange; Michael W. Brogan, Hermosa Beach, all of Calif.; Larri Rosser, Ft. Worth; John R. Tiffany, Grand Prarie, both of Tex.

[73] Assignee: Hughes Aircraft Company, Los Angeles, Calif.

[21] Appl. No.: 589,682

[22] Filed: Jan. 22, 1996

[51] Int. Cl.⁶ ............................................. G06F 17/00
[52] U.S. Cl. ............................................. 364/400; 395/348
[58] Field of Search ............................ 364/460; 340/944, 340/995; 345/102, 115, 116, 8, 158; 395/348

[56] References Cited

U.S. PATENT DOCUMENTS

| | | | |
|---|---|---|---|
| 4,438,438 | 3/1984 | Arens | 343/451 |
| 4,597,740 | 7/1986 | Stickel | 434/20 |
| 4,977,509 | 12/1990 | Pitchford et al. | 364/449 |
| 5,281,957 | 1/1994 | Schoolman | 345/8 |
| 5,416,730 | 5/1995 | Lookofsky | 364/708.1 |
| 5,450,596 | 9/1995 | Felsenstein | 395/800 |
| 5,515,070 | 5/1996 | Kawada | 345/8 |
| 5,563,630 | 10/1996 | Tsakiris et al. | 345/160 |
| 5,583,776 | 12/1996 | Levi et al. | 364/450 |

FOREIGN PATENT DOCUMENTS

| | | |
|---|---|---|
| 0 567 660 A | 11/1993 | European Pat. Off. |
| WO 93 19414 A | 9/1993 | WIPO |
| WO 95 16948 A | 6/1995 | WIPO |

OTHER PUBLICATIONS

Patent Abstracts of Japan—vol. 096, No. 005, 31 May 1996 & JP 08 000573 A (Sony Corp). 9 Jan. 1996.
Patent Abstracts of Japan—vol. 096, No. 005, 31 May 1996 & JP 08 016608 A (Fujii Xerox Co. Ltd), 19 Jan. 1996.
Proceedings of the Ninth Conference on Artificial Intelligence for Applications, vol. 9, 1–5 Mar. 1993, Orlando, US p. 469 XP000670398 Wallfesh: "Les: An Expert System for Infantry Load Planning".
"Hand–Helds on the Battlefield: Grunts are to get the Texas Micro Grunt"; Computergram International; Aug. 10, 1994.
"G.I. Computer: Soldier's Computer to Give Low–Tech Infantry a High–Tech Edge"; Edge: Work–Group Computing Report, vol. 2, No. 55, p. 8; Jun. 10, 1991.
Texas Microsystems® Product Announcement for Hand–Held Computers Based on GI Computer; Date Unknown.

*Primary Examiner*—Michael Zanelli
*Attorney, Agent, or Firm*—G. S. Grunebach; M. W. Sales; W. K. Denson-Low

[57] ABSTRACT

The present invention relates to a method and device for providing a graphical user interface between an individual soldier and a computer-based warfare system worn by him. The graphical user interface is made up of icon-based visual control and information screens that the soldier views on a display and manipulates with a computer mouse-like device. The interface allows the individual soldier to: view information gathered by a variety of sources, including sensor components, radios, and satellites; process information using a variety of input devices and software utilities; and, act on that information using weapons, communications devices, and the like. The graphical user interface organizes information into three distinct "combat task" groups and provides the soldier with easily understood pictorial icons to select. By tailoring the information to a particular situation, the graphical user interface allows the soldier to view critical data without being overwhelmed by too much information.

27 Claims, 5 Drawing Sheets

GRAPHICAL USER INTERFACE SYSTEM FOR MANPORTABLE APPLICATIONS

BACKGROUND OF THE INVENTION

The present invention relates generally to the efficient management of computer information by a human user. More specifically, the present invention relates to a graphical user interface system for a warfare system which is worn by an individual soldier. The interface allows the individual soldier to receive, process, and possibly transmit information gathered by a variety of sources and processed by a central microprocessor in the warfare system.

Modern technology, especially computers and electronics, have advanced rapidly in the recent past. It is only logical that these technological advances would be applied to the art of war, specifically to weapons and other equipment designed to make the modern soldier a more efficient fighting machine.

One approach for applying the technological advances to improve the soldier's efficiency is to view the soldier as one part of a comprehensive warfare system. This warfare system approach must give a soldier the ability to devise real-time solutions to problem situations and keeps the soldier responsive and flexible enough to operate in an uncertain and frequently dangerous environment.

The first major system to propose a system warfare approach was the Soldier Integrated Protective Ensemble ("SIPE"), developed experimentally by the U.S. Army. The SIPE attempted to integrate multiple electronics subsystems and related elements and provided the soldier-user with easy-to-use means to interface with those subsystems. The lessons learned from the SIPE experiment led to the development of a new generation warfare system known as the Land Warrior ("LW") , which is currently being pursued by a number of defense contractors. The LW includes improvements in communications, computing, night vision, weaponry, ballistic protection, and load carrying capability while providing the individual soldier with enhanced lethality, command and control, survivability, mobility, and sustainment.

The LW system is divided into various subsystems, each subsystem consisting of similar or related hardware and software which is dedicated to accomplishing a certain task or family of tasks. The LW system is composed of five such subsystems: (1) Computer/Radio Subsystem ("CRS"); (2) Weapon Subsystem ("WS"); (3) Integrated Helmet Assembly Subsystem ("IHAS"); (4) Protective Clothing and Individual Equipment Subsystem ("PCIES"); and, (5) LW Software Subsystem ("SS").

For a comprehensive system such as the LW system to be effective, it must do more than gather large amounts of data. The data obtained must be organized and relayed to the individual soldier in an easy-to-understand format. Prior to the SIPE experiment, a soldier's "systems" were completely isolated from each other. There was no central microprocessor, so any systems used were coordinated only by the soldier himself. For example, the use of a precision range finding device, such as a laser range finder, could not be electronically integrated with the soldier's weapon. The soldier's navigational "system" consisted of several maps carried in his backpack or pockets, and the dissemination of navigational information was confined to verbal communication. SIPE attempted to connect all of the soldier's systems and eliminate the isolated nature of them using the system warfare approach. Unfortunately, the SIPE experiment did not go far enough. Informational output to the soldier (such as navigational and topographic information) was limited to text only. In other words, all the information which was routed to the soldier looked exactly the same, regardless of differences in magnitude of importance. Lacking the ability to quickly prioritize information and take action based on that information, the SIPE was less than ideal, especially during chaotic and potentially life-threatening situations.

SUMMARY OF THE INVENTION

The Graphical User Interface ("GUI") of the present invention is designed to overcome the problems encountered with the SIPE experiment and what came before SIPE. The GUI is a software-based, hardware implemented system which serves as the primary interface between the soldier and the LW system. It provides the soldier with a simple, intuitive method of observing, interacting with, and controlling the many features of the LW system. The GUI is in part made up of icon-based visual control and information screens that the soldier views one of several video display options and manipulates by pointing on a screen with a mouse-like device. The large, pictorial icons generated by the GUI are easy to read and comprehend, even under adverse visual conditions and in stressful situations.

The GUI includes access to tactical data including digitized battle information, electronic range cards, video imaging, radio control, electronic message generation and reception, and inventory status. It also provides utilities such as word processing, file management, and graphics manipulation.

One major advantage of the GUI is its ability to provide the soldier with information specifically tailored for the combat task at hand. Combat tasks are organized into three major segments ("fight", "caution", and "plan") associated with soldier operational states to ensure that all oft he soldier's needs are met for each situation encountered.

In the "fight" combat state, the soldier's mission is to survive and destroy the enemy. Information, provided by the GUI for this state is concise and to the point, and is highly focused on enemy actions, targets engagements, receipt and transmission of command and intelligence data.

In the "caution" state, the soldier's concentration is on preparedness for combat. Information supplied by the GUI to the soldier mainly involves situation awareness, reconnaissance results, changes in the tactical situation, command and control inputs from squad and platoon leaders, and status of supplies and ammunition.

In the "plan" state, the soldier is concerned with reorganization and consolidation of forces while awaiting combat, including tactical mission planning. The GUI provides information concerned with intelligence, operational readiness, and training.

The invention itself, together with further objects and attendant advantages, will be best understood by reference to the following detailed description, taken in conjunction with the accompanying drawings.

DETAILED DESCRIPTION

Overview

Figure 1:
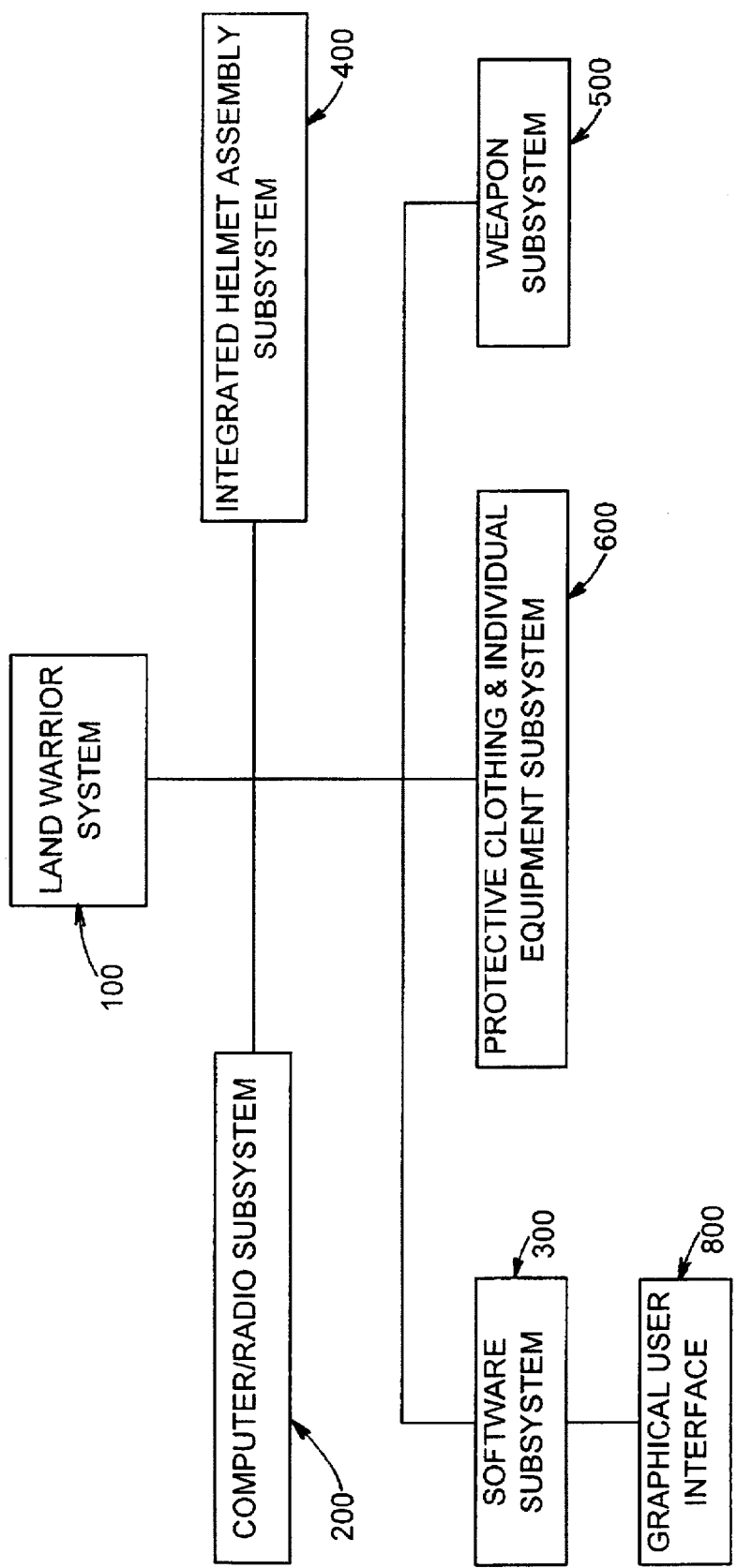
FIG. 1 is a block diagram of the LW system which incorporates the graphical user interface ("GUI") of the present invention.

The Graphical User Interface ("GUI") 800 of the present invention provides a simple, intuitive method of controlling the Land Warrior ("LW") system 100, shown as a block diagram in FIG. 1. The LW system 100 includes the Computer/Radio Subsystem ("CRS") 200, the Software Subsystem ("SS") 300, the Integrated Helmet Assembly Subsystem ("IHAS") 400, the Weapon Subsystem ("WS") 500, and the Protective Clothing and Individual Equipment Subsystem ("PCIES") 600. The GUI 800 itself is considered part of the SS 300. Together, these subsystems can amass a staggering amount information. With the help of the GUI 800, the soldier can efficiently retrieve, process, and transmit information supplied by the subsystems, giving the proper priorities to emergent conditions without being overwhelmed by too much information.

I/O Structure

Figure 2:
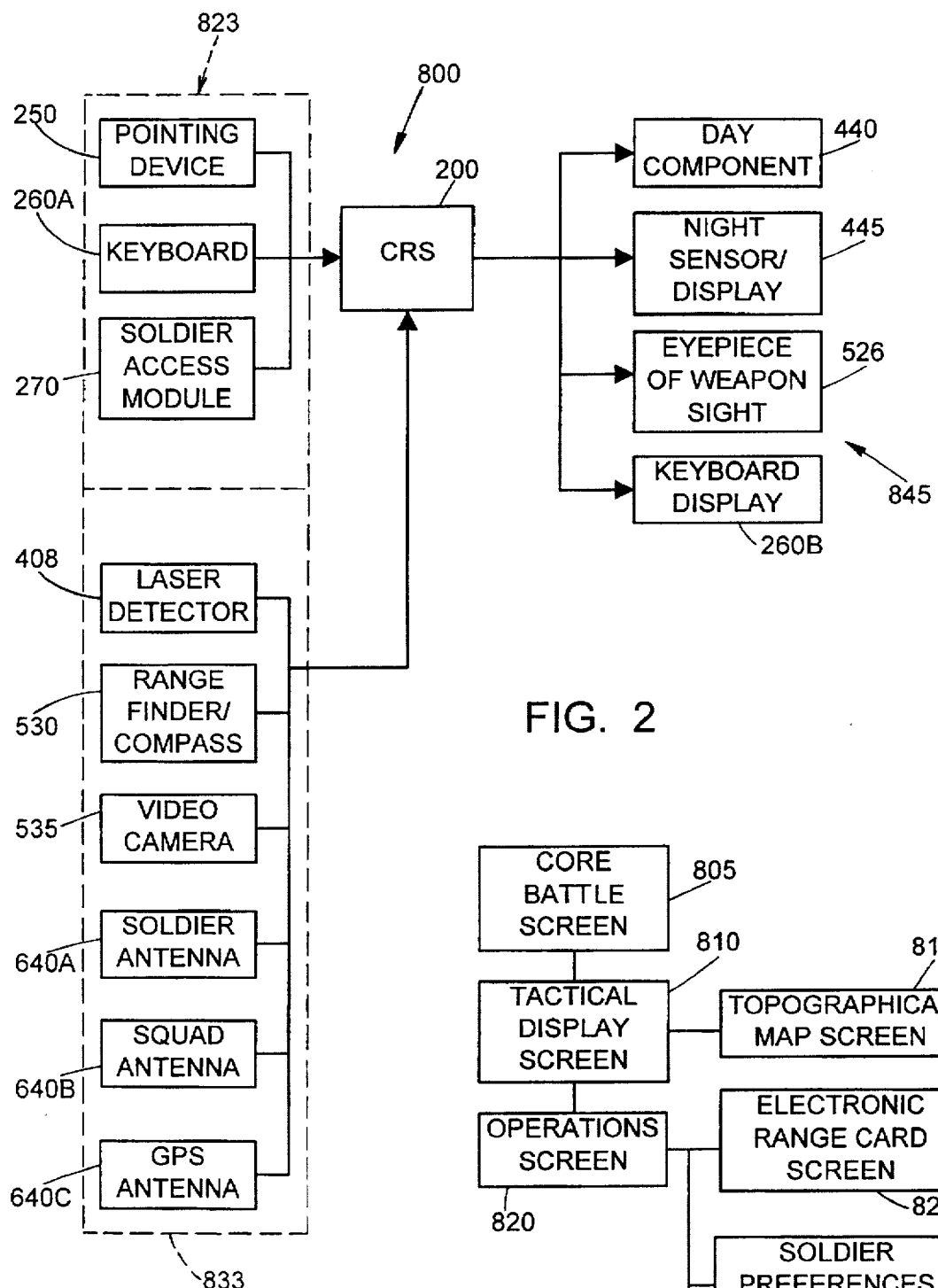
FIG. 2 is a block diagram of the input/output structure of the present invention.

The input/output ("I/O") structure of the Computer/Radio Subsystem 200 as it relates to the GUI 800 is shown in FIG. 2. All I/O devices mentioned will be further described in detail below.

There are at least four sources 825 for the soldier to input data into the CRS 200. A Remote Indicating /Pointing Device 250, the primary means of inputting data into the CRS 200, is a computer mouse-like device which is attached to the clothing of the soldier. A hand held keyboard 260a is an optional input device usually reserved for unit leaders. A Soldier Access Module 270 is a portable self-contained data storage device which plugs into the CES 200 for data transfer.

There are many external sources 835 of information which may input into the CRS 200. They may include: laser detectors 408–411, which indicate when the soldier is spotted by an enemy laser; a laser range finder\digital compass assembly 530 for computing target ranges and providing navigational information; a video camera 535 which provides video images to the CRS 200; the soldier and squad radio antennas 640a and 640b, respectively, for receiving both voice and data transmissions; and, the GPS antenna 640c for supplying Global Positioning System information to the CRS 200.

There are at least four output devices 845 which convey image and text information to the individual soldier. The Day Component 440 and Night Sensor/Display Component 445 (which together make up the Sensor Display Assembly 432) handle most of the display work. However, signals maybe routed to the eyepiece 526 of the Thermal Weapon Sight 525 or to the display 260b of the hand held display/keyboard 260 if needed.

Soldier Input

Figure 3:
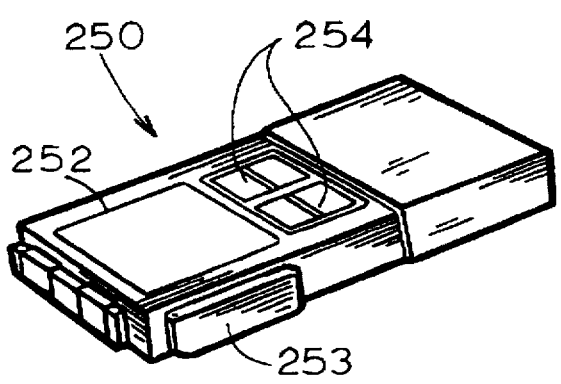
FIG. 3 is a front perspective view of the Remote Pointing/Indicating Device of the present invention.

The Remote Pointing and Indicating Device ("RIPD") 250 shown in FIG. 3 is the primary input device for the soldier. The RIPD 250 is a computer mouse-like device for entering data into the CRS 200. The pointing surface 252 is a capacitive membrane which allows the soldier to move a cursor on the screen with his finger. The functions of buttons 254 airs programmable, for example, to allow the soldier to select a certain display or to select a desired sensor component. The RIPD 250 contains a keyboard-like 8-bit controller (not shown) to send button pushes to the microprocessor (not shown) of the CRS 200.

Figure 6:
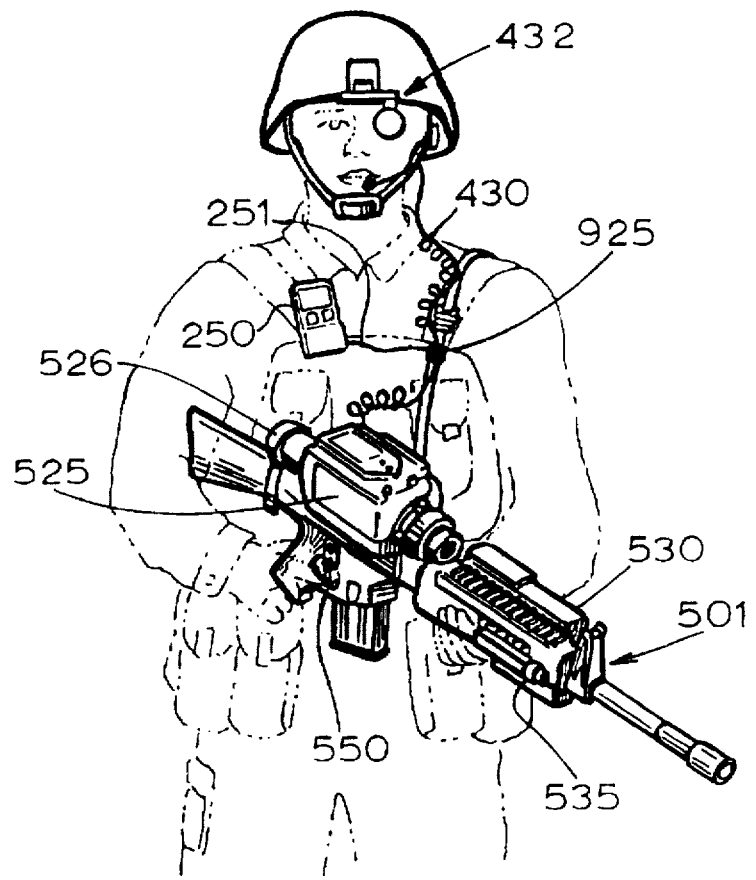
FIG. 6 is a front perspective view of a soldier-user of the graphical user interface of the present invention.

The remote CRS control 550 is a two-position membrane switch of conventional construction designed to provide a back-up control for the RIPD 250. The remote CRS control 550 is located just above the trigger of the soldier's weapon, as shown in FIG. 6. From the remote CRS control 550, the soldier can select the video camera 535, the thermal weapon sight 525, or the laser range finder/digital compass assembly 530 or toggle between main battle display screens (all described further herein).

Figure 4:
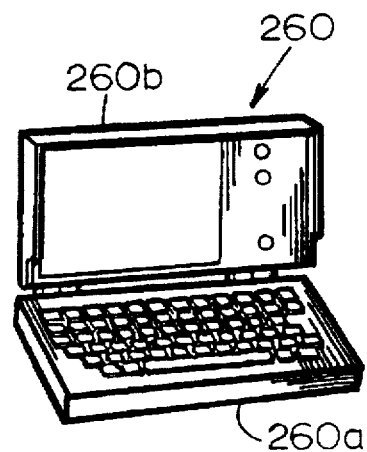
FIG. 4 is a front perspective view of the hand held keyboard/display unit of the present invention.

Certain military personnel, for example, unit leaders, may be provided with the separate hand-held keyboard/display unit 260 shown in FIG. 4. The keyboard/display unit 260 is made up of two sections, the keyboard section 260a and the display section 260b, further described herein. The keyboard/display unit is a typical "clamshell" design, very much like a standard notebook computer. The keyboard section 260a is a standard off-the-shelf ("QWERTY") keyboard and is designed to be used during normal (non-combat) operations for text entry. The two sections 260a and 260b may be used together, as shown in FIG. 4, or may be used separately.

Figure 5:
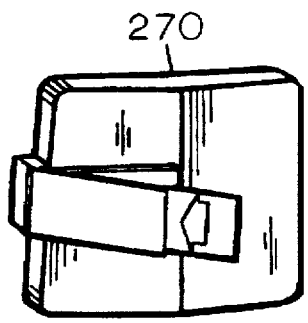
FIG. 5 is a front perspective view of the Soldier Access Module of the present invention.

The Soldier Access Module ("SAM") 270, also known as the mission data module, shown in FIG. 5 is a portable data storage device which allows the soldier to customize the LW system for each mission undertaken. The SAM 280 is plugged into the CRS 200 prior to a mission. The data transferred to the CRS 200 from the SAM 270 may include a combat ID, codes, or specific mission information which allow the LW system 100 to support the individual soldier in every way possible during the upcoming mission.

External Input

One of the key features of the LW system 100 is its ability to gather large amounts of data from external sources and to input that data to the CRS 200. With the data stored and organized in the CRS 200, it is then available for the soldier to retrieve as necessary. External sources of information may include sensor-type components as well as other sources such as radio or satellite signals.

The first example of a sensor-type component is the four-unit set of laser detectors 408–411. These laser detectors 408–411 are of conventional design and are mounted on the helmet 402 of the soldier, best shown in FIG. 7. Once the laser detectors 408–411 sense an incoming laser, the soldier is alerted to the source of the laser via art Emergency Alert message on one of the displays, as further described herein.

Another vital external source of information is the laser range finder/digital compass assembly ("LRF/DCA") 530 for computing target ranges and providing navigational information. The LRF/DCA, shown generally in FIG. 6, is an integration of two commercially available components: a Fibertek mini-laser range finder and Leica digital compass assembly. Mounted on the soldier's rifle 501 or other modular weapon (not shown), it can provide a wealth of information to the CRS 200.

A video camera 535 is a third example of an external source which provides images to the CRS 200. The video camera 535 is also mounted to the soldier's rifle 501 or other modular weapon (not shown) similar to the LRF/DCA 530. The camera 535 is an off-the-shelf component manufactured by Sekai Electronics, model number RSC-780.

The soldier and squad radio antennas 640a and 648b only in FIG. 2) are mounted on the load carrying equipment ("LCE") of the individual soldier (not shown) and receive radio signals from radios (not shown) carried by other members of a military contingent. The antennas 640a and 640b, which are of conventional construction, are an important external source of information. They can receive data signals (much like a standard modem) at a rate of 64 kilobits per second as well as standard voice transmissions which provide the soldier with the most current developments during operations.

The GPS antenna 640c is the final example of an external source of data which supplies Global Positioning System information to the CRS 200. GPS satellites (not shown) can identify a geographical position within one meter of any location on earth. Such locational information is crucial to the individual soldier attempting to report the movement of enemy troops, the location targets, and the like.

Output

Figure 7:
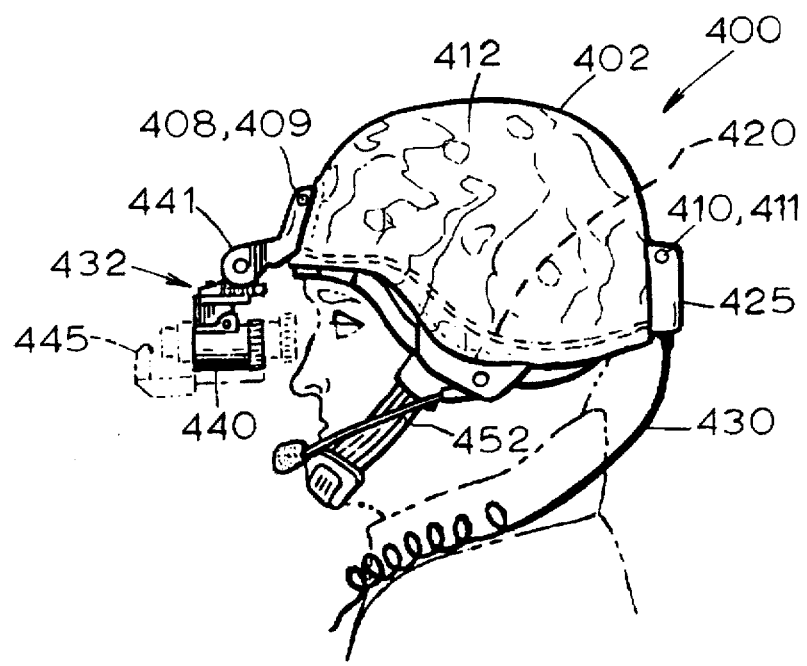
FIG. 7 is a side elevational view of the IHAS as it relates to the present invention.

The primary display of the Graphical User Interface 800 is the Sensor Display Assembly ("SDA") 432 of the IHAS 400, best shown in FIG. 7. The SDA 432 is a two-piece monocular device having an LCD display which provides the soldier with display capabilities from various components throughout the subsystems. The SDA 432 includes a Day Component 440 and a Night Sensor/Display Component 445.

The SDA 432 is wired through the DC/NSDC helmet mount 441 to the Display Electronics Module 425 via cable 420. The cable 420 rune along the lower edge of the outer surface of the helmet shell 402 but is hidden beneath the cloth cover 412. The Display Electronics Module 425 is wired through cable 430 to junction block 925 and through wires (not shown) contained in the soldier's Load Carrying Equipment (not shown) to the CRS 200.

The Thermal Weapon Sight ("TWS") 525, shown generally in FIG. 6, is a thermal sighting system designed by Hughes Aircraft for use by the U.S. Army (military designator AN/PAS13). Besides performing its design function, the display 526 of the TWS 525 also provides an alternate display for the Sensor Display Assembly 432 of the IHAS 400.

The display section 260b of the hand held keyboard/display unit 260 is the complement of the keyboard 260a, previously described herein. The display 260b is a conventional LED design which can be used by the individual soldier as an alternate display to the Sensor Display Assembly 432.

Operation of the GUI

Figure 8C:
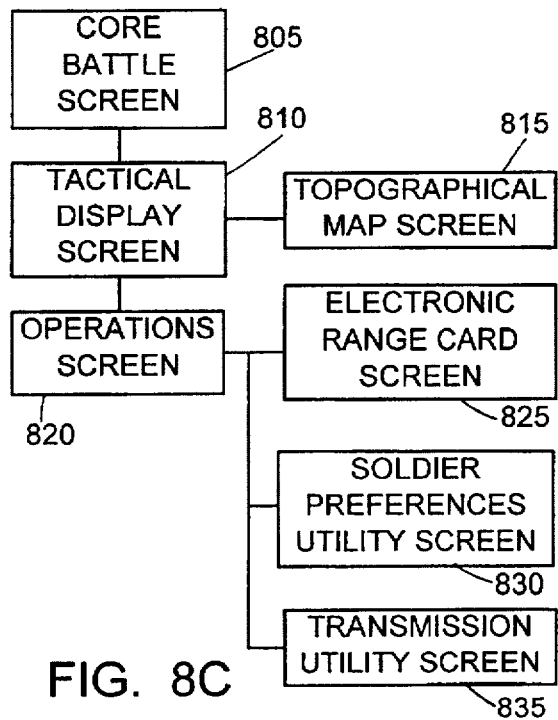
FIG. 8C is a block diagram of a sequence of screens displayed by the present invention.
Figure 8B:
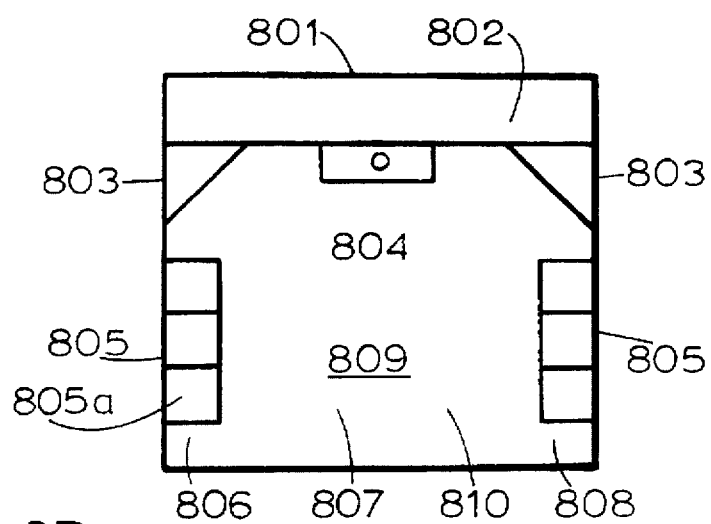
FIG. 8B is a typical screen layout as displayed by the present invention.
Figure 8A:
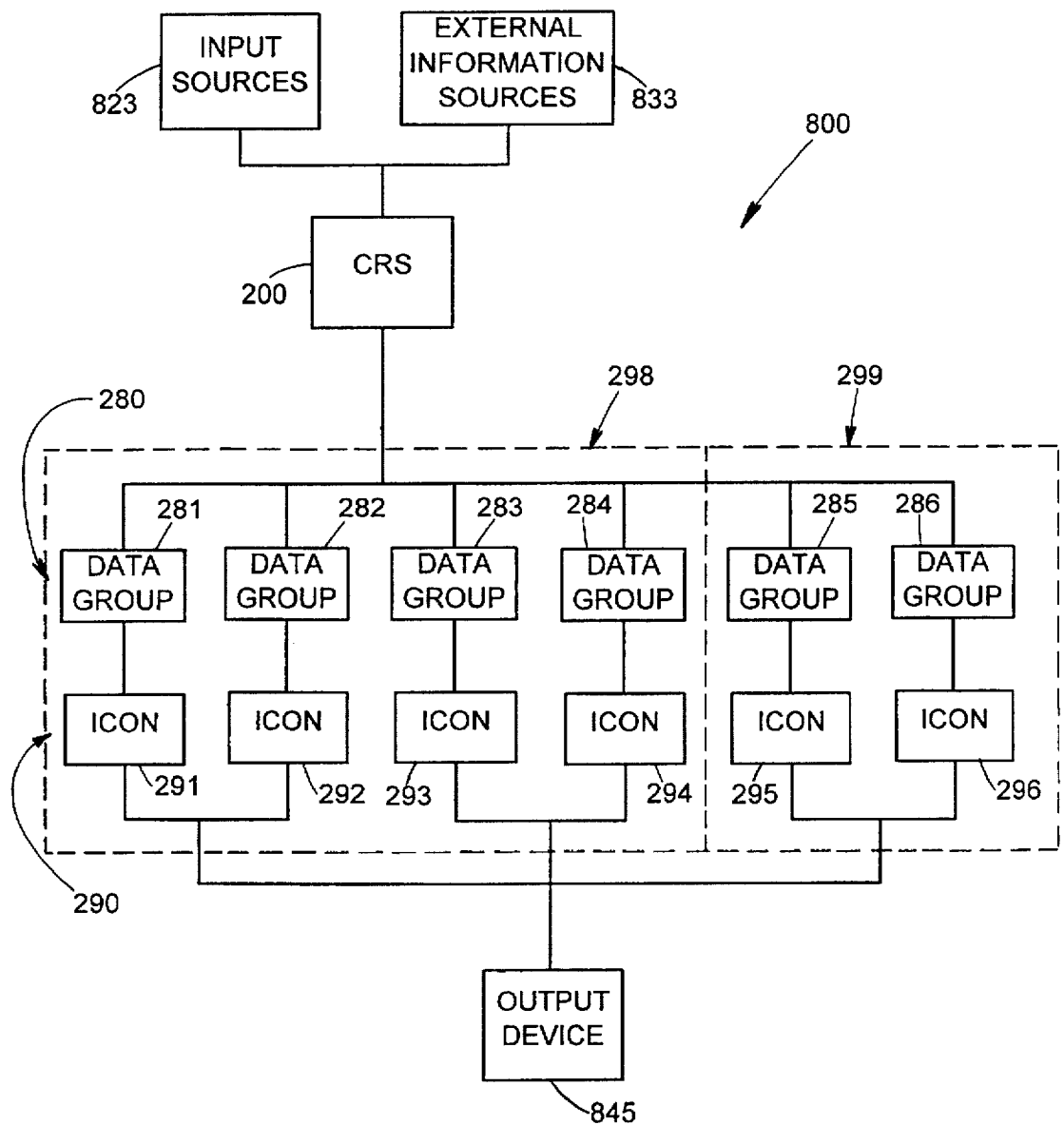
FIG. 8A is a block diagram of the LW system which incorporates the graphical user interface ("GUI") of the present invention.

As FIG. 8A illustrates, the GUI 800 organizes the enormous amount of available information and functions into easily understandable groups so that the individual soldier can access it quickly and efficiently. As soldier input sources 825 and external information sources 835 supply information to the CRS 200, the GUI 800 organizes the information into data groups 280. There are currently sixteen data groups divided into either a functional set 298 or a utilities set 299. The functional set includes communications, location, fire control, soldier preferences, weapon, system control, imaging, timing, messages, inventory, user support, and startup data groups. The utilities set includes word processor, draw package, file manager, help, computer-based training driver, and radio transmission utility data groups. Each data group 281–286 is represented by an easily understandable pictorial icon 291–296. The icons 290 are routed to one of a variety of "screens" depending upon whether each data group 281–286 corresponding to each icon 291–296 is classified as functional or utility. The screens, described further herein, are a composite arrangement of icons, video images, and text displayed on an output device 845.

For example, information related to communications being input into the CRS 200 from an external source 835 would be classified as a part of the functional set 298, may be organized into a data group 281, which is represented by the icon 291. A typical icon for communications related information may be shaped like a radio. When the icon 291 is selected by the soldier (using a soldier input device 825), the communications information would then appear on an output device 845. Similarly, if the soldier needed to draw a sketch, he would use a soldier input device 825 to select an icon 296 (which may be shaped like a pen) to access the proper data group 286, which would be draw package information.

The individual soldier physically interacts with the Graphical User Interface ("GUI") 800 by observing screens on one of its displays, usually the Sensor Display Assembly 432 of the IHAS 400 (shown in FIG. 7), and selectively choosing on-screen options. The GUI 800 allows smooth transition between screens and modes of operation.

A typical screen layout 801 is shown in FIG. 8B. Area 802 is located along the upper edge of the screen 801 and is reserved for a title bar (not shown). Areas 803 are located in the upper corners of the screen 801 and are reserved for hot buttons (not shown). Icon bars (not shown) may be located along the right and left edges of the screen 801 in areas 805. Pictorial icons (not shown) are located in the icon bar area 805 and represent the various data groups of information available to be selected. Emergency alerts or other information (not shown) may appear in the lower center portion 807 of the screen 801, also as a pictorial icon; the lower left corner 806 and the lower right corner 808 may also contain relevant data such as weapon inventory and the correct time, respectively. A message (not shown) may appear directly under the emergency alert area 880 in scroll bar area 810. Finally the remaining portion of the screen 809 displays a selected image (not shown), for example, a video camera image, topographical map, etc.

The block diagram of FIG. 8C shows the screen sequence as seen by the individual soldier as he operates the GUI 800. The GUI 800 screens are configured for two basic modes of operation: Battle Mode and General Operations Mode. The default mode of operation, the Battle Mode, provides the soldier with only that information which increases his lethality and improves his survivability.

The two screens available in the Battle Mode are the Core Battle Screen 805 and the Tactical Display Screen 810. When placed in the Battle Mode, the GUI 800 defaults to the Core Battle Screen 805. The Core Battle Screen 805 displays a visual or sensor target view (not shown) in the middle center portion 809 of screen 801 overlaid by a target reticle (not shown), optional time/weapon status icons (not shown) in lower left corner 806 and lower right corner 808, respectively, and emergency alerts (not shown) in the emergency alert area 807 when required.

The soldier can toggle back and forth between the Core Battle Screen 805 and the Tactical Display Screen 810 using weapon-mounted remote CRS control 550, shown in FIG. 6. The Tactical Display Screen 810 provides immediate tactical positioning information.

Both screens 805 and 810 feature an Emergency Alert area 807. The LW system 180 inserts pictographs (not shown) in this space 807 to warn the soldier of neurological, biological, or chemical ("NBC") threats, imminent system failure, or other critical conditions. Unit leaders may also insert emergency text messages (not shown) in this area 807 to be viewed by the individual soldier.

The GUI 800 provides the soldier with one-touch control of critical operations within the data tiers via hot buttons (not shown) located in screen portions 803. The function of these buttons can be fixed or programmed by the unit leader. For example, a hut button (not shown) on the Tactical Display Screen 810 could be used to instantly call up a topographical map screen 815 when needed.

The soldier may place the system into the General Operations Mode from the Battle Mode by selecting the tools icon (not shown) located in area 804. The operations screen 820 appears first and includes a Functional Toolchest set of icons (not shown) in the icon bar area 805. The GUI 800 returns to the Battle Mode upon the command of the soldier or his leader.

The Functional Toolchest contains icons (not shown) representing classes of data and operations that the soldier may select. A readily understandable icon represents each class of data and functions. For example, a "radio-shaped" icon (not shown) represents communications, an "artillery-shaped" icon (not shown) represents a call for a fire mission. Choosing an icon may also cause the GUI 800 to display further screens. For example, by selecting a "rifle-shaped" icon (not shown), a electronic range card screen 825 is accessed for target identification.

The Utility Toolchest programs such as word processing and file management are also represented by icons (not shown). For example, by selecting a "finger-pushing-a-button-shaped" icon (not shown), a Soldier Preferences Utility screen 830 is accessed; by selecting a "winged-radio-shaped" icon, a Transmission Utility Screen 835 is accessed to allow the soldier to transmit a message.

The key to the GUI 800 is the organization and presentation of each screen in each mode. The soldier is provided with all of the relevant information needed for a specific mission and nothing else. By tailoring each presentation of information to a particular situation, the GUI 800 provides information to the soldier quickly and in a way that is easily understood, thus increasing his overall efficiency.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of the invention.

What is claimed is:

1. In a multiple function warfare system worn by an individual soldier, a device for interfacing said individual soldier with said warfare system, said device comprising:
   a processing section carried by said individual soldier and configured to organize information developed by the warfare system into a first category, a second category, and a third category, the first, second and third categories each being associated with a respective task encountered by the soldier;
   an input section connected to said processing section for permitting the soldier to input data into the processing section; and,
   an output section connected to said processing section for outputting the information organized in a respective one of the first, second, and third categories, when the soldier is engaged in the respective task associated with the respective one of the categories.

2. The device according to claim 1 wherein said processing section comprises a microprocessor.

3. The device according to claim 1 wherein said input section comprises a remote pointing and indicating device.

4. The device according to claim 1 wherein said input section comprises a keyboard.

5. The device according to claim 1 wherein said input section comprises a portable data storage device.

6. The device according to claim 1 wherein said output section comprises a display.

7. The device according to claim 6 wherein said display comprises a thermal weapon sight.

8. The device according to claim 6 wherein said display comprises a day component of a sensor display assembly.

9. The device according to claim 6 wherein said display comprises a night component of a sensor display assembly.

10. The device according to claim 1 wherein the information in the first category comprises one of the group consisting of: enemy action information, target engagement information, command data, and intelligence data.

11. The device according to claim 1 wherein the information in the second category comprises one of the group consisting of: situation awareness information, reconnaissance information, tactical situation changes, status of supplies and ammunition, and commands from leaders.

12. The device according to claim 1 wherein the information in the third category comprises one of the group consisting of: intelligence information, operational readiness information, training information, and tactical mission planning information.

13. In a multiple function warfare system worn by an individual soldier, a method of managing information comprising the steps of:
   gathering said information developed by the multiple function warfare system;
   routing said information to a central microprocessor;
   organizing said information into a first category, a second category, and a third category, the first, second, and third categories each being associated with a respective task encountered by the soldier;
   organizing the information in each of the first, second, and third categories into a plurality of data groups;
   creating a pictorial icon to represent each of said plurality of data groups; and,
   displaying a first screen comprised of a first plurality of the pictorial icons when the soldier is engaged in the task associated with the first category, displaying a second screen comprised of a second plurality of the pictorial icons when the soldier is engaged in the task associated with the second category, and displaying a third screen comprised of a third plurality of the pictorial icons when the soldier is engaged in the task associated with the third category.

14. The device according to claim 13 wherein the information in the first category comprises one of the group consisting of: enemy action information, target engagement information, command data, and intelligence data.

15. The device according to claim 13 wherein the information in the second category comprises one of the group consisting of: situation awareness information, reconnaissance information, tactical situation changes, status of supplies and ammunition, and commands from leaders.

16. The device according to claim 13 wherein the information in the third category comprises one of the group consisting of: intelligence information, operational readiness information, training information, and tactical mission planning information.

17. In a multiple function warfare system worn by an individual soldier, a method of managing information comprising the steps of:

routing said information developed by the multiple function warfare system to a central microprocessor;

organizing said information into a plurality of data groups;

creating pictorial icons, each of said icons being representative of at least one of said plurality of data groups;

creating a plurality of screens comprised of said plurality of pictorial icons; and, automatically displaying one of said icons on at least one of said screens when a data group represented by the displayed one of the icons contains information related to emergent conditions encountered by the soldier.

18. The method according to claim 17 wherein an image of at least one of said icons is related in function to the data group it represents.

19. The method according to claim 17 further comprising the step of dividing said plurality of screens into a first mode and a second mode.

20. The method according to claim 19 wherein the icons related to battle functions are displayed in said screens in the first mode.

21. The method according to claim 19 wherein the icons related to operations functions are displayed in said screens in the second screen.

22. The method according to claim 17 wherein each of said plurality of screens comprises a composite of said pictorial icons, video images and text.

23. The method according to claim 17 further comprising the step of displaying one of said plurality of data groups by selecting its representative said pictorial icon.

24. The method according to claim 17 further comprising the step of automatically displaying one of said plurality of icons on one of said screens when one of said plurality of data groups represented by said one of said plurality of icons contains information related to emergent conditions with respect to said soldier.

25. A graphical user interface for use with a multiple function warfare system worn by a soldier comprising:

a battle screen for displaying a visual target;

a tactical display screen for displaying tactical positioning information; and, a general operations screen for displaying communication information;

wherein an emergency alert signal is displayed on whichever one of the battle screen, the tactical display screen and the general operations screen the soldier is viewing at the time of the event giving rise to the emergency alert signal.

26. A graphical user interface as defined in claim 25 wherein the emergency alert signal is displayed to warn the soldier of one of the group consisting of: a neurological threat, a biological threat, a chemical threat, or an imminent system failure.

27. A graphical user interface as defined in claim 25 wherein the emergency alert signal comprises text transmitted to the warfare system.

* * * * *

UNITED STATES PATENT AND TRADEMARK OFFICE
CERTIFICATE OF CORRECTION

PATENT NO. : 5,740,037

DATED : April 14, 1998

INVENTOR(S) : Thomas E. McCann, et al.

It is certified that error appears in the above-identified patent and that said Letters Patent is hereby corrected as shown below:

Column 5, line 58, delete "825" and insert -- 823 -- and delete "835" and insert --833--.

Signed and Sealed this

Twenty-third Day of March, 1999

Attest:

Q. TODD DICKINSON

Attesting Officer

Acting Commissioner of Patents and Trademarks